UNITED STATES PATENT OFFICE.

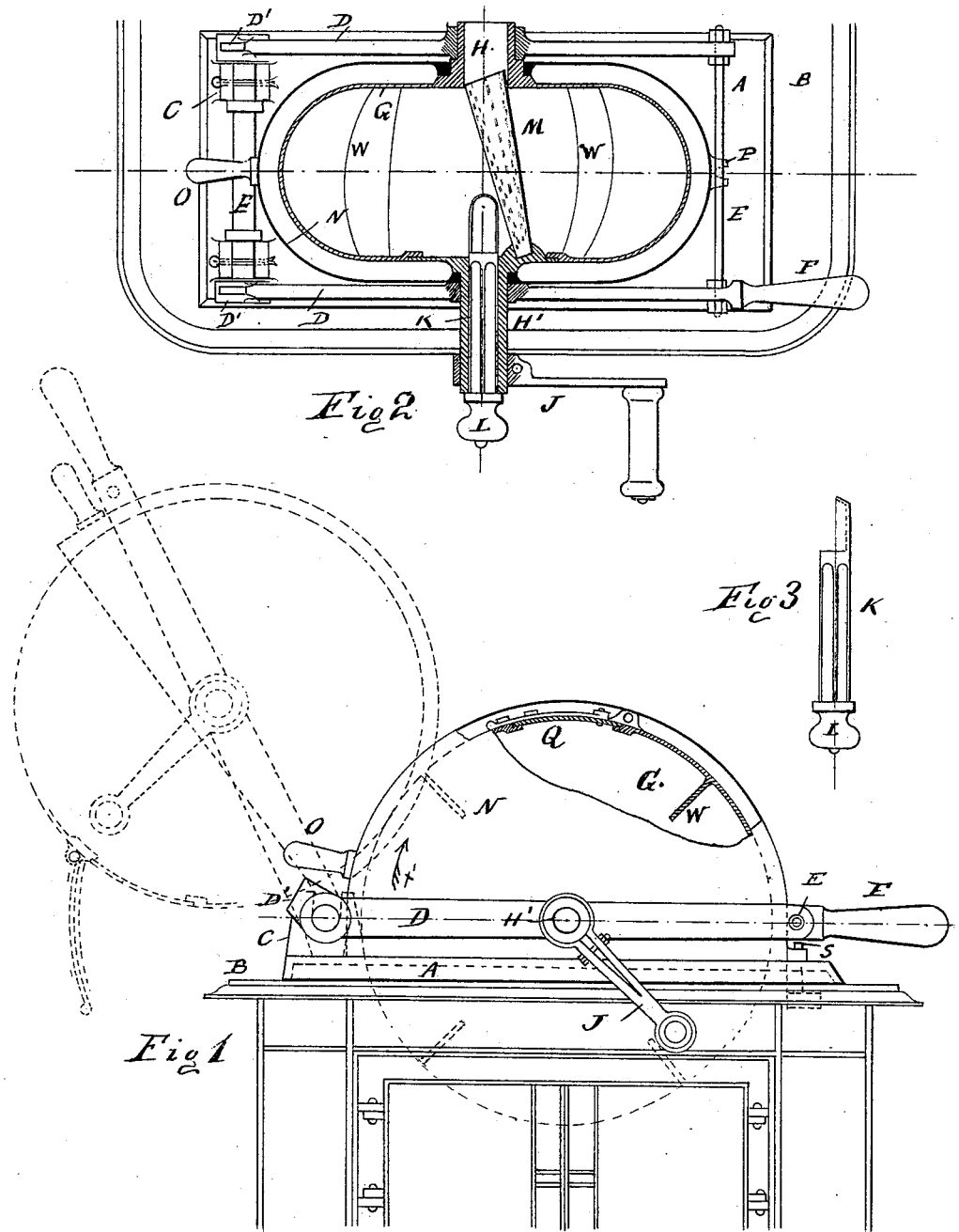

FERDINAND MAASSEN, OF GOTHA, FLORIDA.

COFFEE-ROASTER.

SPECIFICATION forming part of Letters Patent No. 373,531, dated November 22, 1887.

Application filed June 10, 1887. Serial No. 240,854. (No model.)

*To all whom it may concern:*

Be it known that I, FERDINAND MAASSEN, of Gotha, in the county of Orange, State of Florida, have invented certain new and useful Improvements in Coffee-Roasters, of which the following is a specification.

The object of my invention is to provide a new and improved coffee-roaster which can be placed upon any ordinary cooking-stove, and which can be lifted from the fire easily and held in the raised position, and which roaster is simple in construction.

The invention consists of a coffee-roaster comprising a base-plate having an opening for the roasting-vessel, levers pivoted to said base-plate, a rotary coffee-roasting vessel provided with two tubular trunnions mounted to turn on said levers, a casing mounted on said trunnions, a testing-spoon in one of the tubular trunnions, and a perforated cone arranged in the roasting-vessel, which perforated cone is inclined to the axis of the rotating vessel, the smaller end of the cone being closed and the larger end being in communication with that tubular trunnion opposite the one in which the testing-spoon is inserted, as will be fully described and set forth hereinafter, and finally pointed out in the claim.

In the accompanying drawings, Figure 1 is a side view of my improved coffee-roaster, parts being broken out and others being in section, and the parts being shown in different positions by dotted lines. Fig. 2 is a sectional plan view of my improved coffee-roaster. Fig. 3 is a detail side view of the testing-spoon.

Similar letters of reference indicate corresponding parts.

The flat frame A or base-plate, which can be placed and held upon the top plate, B, of an ordinary cooking-stove, is provided at one end with the upwardly-projecting lugs C, to which the levers D are pivoted, said levers being united by the cross rods or braces E, one of the levers being provided at the swinging end with the handle F. The spheroidal roasting-vessel G is provided with the two opposite tubular trunnions, H and H', which are mounted to turn in suitable bearings on the levers D, thus adapting the vessel G to rotate between the two levers. The tubular trunnion H' is extended, and on its end the crank-handle J is clamped.

A testing-spoon, K, fitting closely in the tubular trunnion H', is passed into the same, the bowl of the spoon projecting into the interior of the roasting-vessel, and the knob L on the outer end of the handle of the spoon resting against the outer end of the trunnion, and thus closing the same.

A perforated cone, M, is held diagonally in the roasting-vessel, the smaller end of said cone being closed by the side wall of the roasting-vessel, while the wider end is in communication with the tubular trunnion H, thus permitting the generated gases to pass out of the roasting-vessel through the said perforated cone and the trunnion H.

A semi-spheroidal casing, N, surrounding the upper part of the roasting-vessel, is mounted to turn or swing on the trunnions H H', which pass through the sides of said casing short distances above the bottom edges of said sides. The casing N is provided at one end with the handle O and at the opposite end with the notched lug P. The roasting-vessel G is provided in its top with the hinged or sliding door Q and on its inside with a series of transverse partitions, W, provided at the rim parts of said vessel only.

The levers D are provided at their pivoted ends with the check-lugs D', which, when said levers are swung up, rest upon the top of the plate A and hold the levers D in the position shown in dotted lines in Fig. 1.

The operation is as follows: The coffee is placed into the roasting-vessel G and the same swung into the position over the fire, as shown in Fig. 2, and is turned slowly by means of the crank-handle. The partitions W throw the coffee about in the vessel G and prevent the same remaining in one place of the vessel. At suitable times samples of the coffee are removed from the roasting-vessel by means of the spoon K, and when the coffee is properly roasted the levers D are swung up into the position shown in dotted lines in Fig. 2, in which they are held by the stop-lugs. The casing is then swung in the direction of the arrow x', Fig. 1, whereby its position is reversed, as shown in Fig. 1 by the dotted lines, and then the roasting-vessel G is turned so that the gate Q is at the bottom, whereupon the same is opened to permit the coffee to drop into a suitable receptacle.

When the casing N is in the position shown in full lines in Fig. 1, it is locked in place by means of the latch S, which engages the notched lug P on the end of the casing and the under side of the top plate, B, of the stove.

This machine can also be used for roasting peanuts, &c.

Having thus described my invention, I claim as new and desire to secure by Letters Patent—

In a coffee-roaster, the combination, with a base-plate having an opening, of levers pivoted on the base-plate, a rotary coffee-roasting vessel provided with two tubular trunnions mounted to turn on said levers, a casing mounted on said trunnions, a testing-spoon in one of the tubular trunnions, and a perforated cone arranged in the roasting-vessel, which perforated cone is inclined to the axis of the rotating vessel, the smaller end of the cone being closed and the larger end being in communication with that tubular trunnion opposite the one in which the testing-spoon is inserted, substantially as set forth.

In testimony that I claim the foregoing as my invention I have signed my name in presence of two subscribing witnesses.

FERDINAND MAASSEN.

Witnesses:
L. A. KOEHNE,
W. C. KOEHNE.